Sept. 5, 1944. P. H. CRAIG 2,357,727
METHOD AND MEANS FOR COOLING GLASS WALLED BODIES
Filed Jan. 2, 1942 2 Sheets—Sheet 1

INVENTOR.
Palmer H. Craig
BY Harry P. Canfield
ATTY.

Sept. 5, 1944.   P. H. CRAIG   2,357,727
METHOD AND MEANS FOR COOLING GLASS WALLED BODIES
Filed Jan. 2, 1942   2 Sheets-Sheet 2
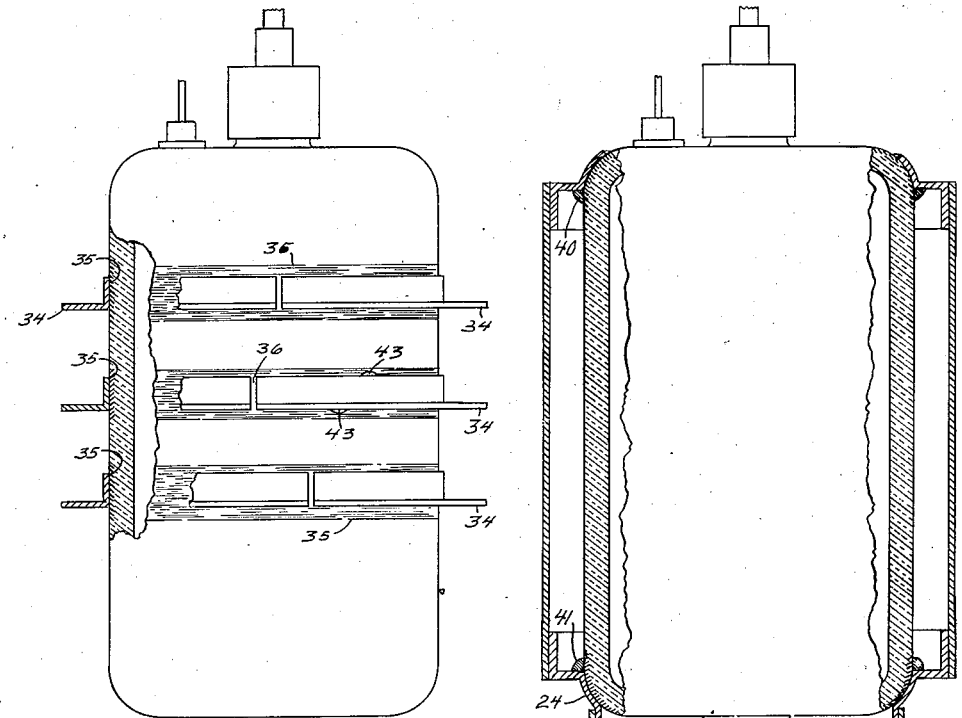
Fig. 6
Fig. 7
Fig. 8
INVENTOR.
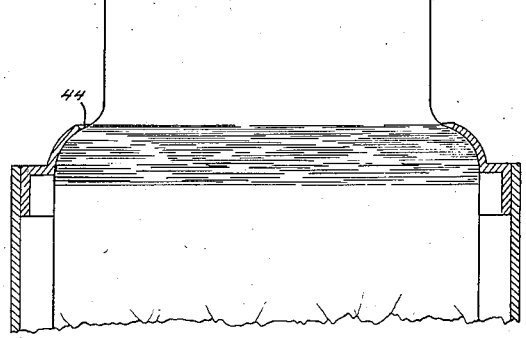
Palmer H. Craig
Harry P. Canfield
ATTY.
BY Patented Sept. 5, 1944

2,357,727

UNITED STATES PATENT OFFICE 2,357,727

METHOD AND MEANS FOR COOLING GLASS WALLED BODIES

Palmer H. Craig, Cleveland Heights, Ohio, assignor to Invex Corporation, Cleveland, Ohio, a corporation of New York Application January 2, 1942, Serial No. 425,414

8 Claims. (Cl. 250—27.5)

This invention relates to the radiation or conduction of heat from bodies comprising a glass or a glass-like surface.

The invention has perhaps its most important use in the cooling of electronic tubes by radiating or conducting heat away from the glass tube envelope, and while it has other uses as will become apparent hereinafter, it will, as an example of its uses, be illustrated and described herein as applied to that particular use.

It is among the objects of the present invention:

To provide generally improved method and means for conducting heat from the glass wall of a vessel;

To provide generally an improved construction of artificially cooled electronic tube or the like;

To provide a method and means for attaching heat transferring elements directly to the glass envelope of an electronic tube or the like whereby improved heat conductivity is effected.

Other objects will be apparent to those skilled in the art to which my invention appertains.

My invention is fully disclosed in the following description taken in connection with the accompanying drawings in which, Fig. 1 is a longitudinal sectional view of a rectifier tube of the pool cathode type and embodying one form of my invention, the wall thickness of the tube envelope being magnified in the drawings for illustrative purposes;

Figure 1:
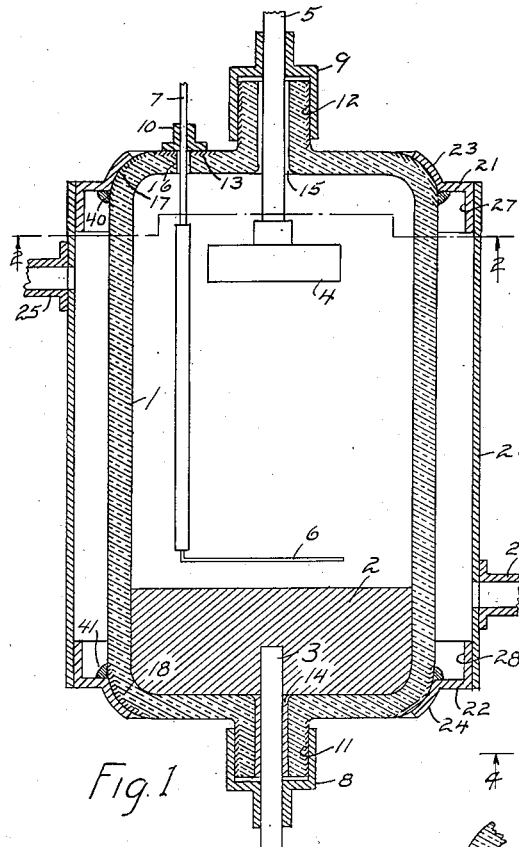
Figures 3, 4, 5:
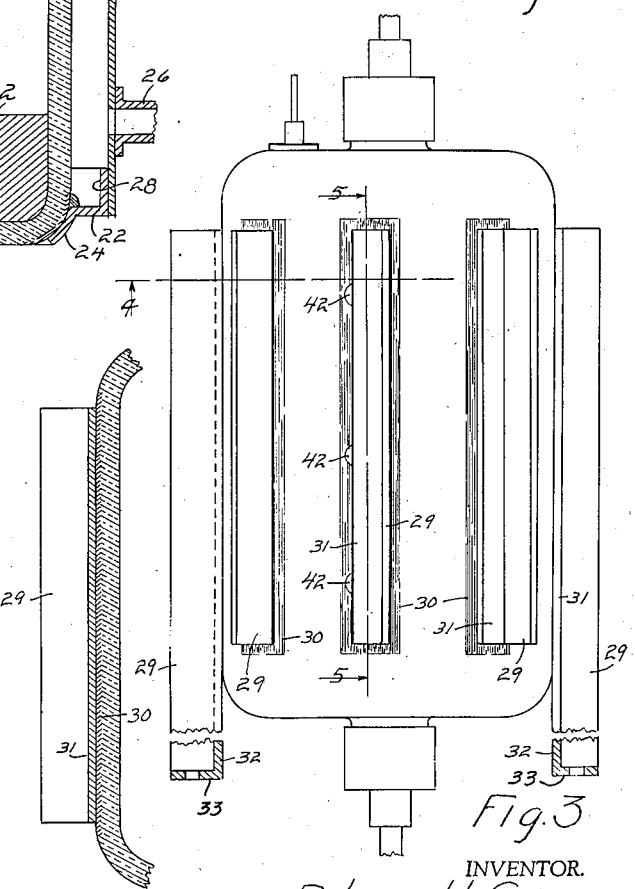
Fig. 3 is an elevational view of a tube similar to that of Fig. 1 illustrating another embodiment of my invention.

Figs. 4 and 5 are sectional views taken respectively from the planes 4—4 and 5—5 of Fig. 3;

Fig. 6 is a view of a tube similar to that of Fig. 1 illustrating another embodiment of my invention;

Fig. 7 is an elevational view showing a modification of the form of my invention of Fig. 1;

Fig. 8 is a fragmentary view similar to a part of Fig. 1, illustrating a modification.

In the several embodiments and modifications of my invention described hereinafter, I utilize a process for attaching metal elements to a glass surface and this will first be described in general.

I first form on the glass surface a metallic layer or skin of a suitable pattern or configuration, the preferred process for forming it being as follows.

There are known liquid preparations or compounds containing among other constituents an oil or like vehicle and a salt of a metal such as platinum, gold, silver, copper, etc. The primary use of such preparations has heretofore been to ornament glassware. A layer or coat of the preparation is painted with a brush or otherwise applied upon the glass surface in the pattern or configuration desired, and is then dried. The glass is then heated, and after cooling, the pattern has the general color of the metal component of the preparation.

The metal layer or skin thus formed has properties of both metal and glass. Its surface is glass-like, the molecules of the metal apparently being merged or mixed with those of the glass and for a substantial depth in the glass surface. I have found that solder will adhere to such a skin and that metal parts can therefore be soldered rigidly to the glass by soldering them to the metallic skin.

The above described process is the one preferred, but a metallic skin or layer which, while inferior to that just described, may be provided by spraying metal upon the glass particularly if the glass is first heated to or approaching fusing temperature, and such a skin or layer may in some cases suffice. Metal spraying processes are known and they may be employed.

A sprayed-on metallic layer on glass can readily be separated or scratched off and when metal parts are soldered to it, the juncture between the part and the glass is not as secure as when the said preferred process is employed to form the skin or layer. But both processes involve the use of heat in forming the skin or layer on the glass and it is believed correct to say that in both cases the metallic layer or skin is heat-fused with the glass surface and therefore my invention comprehends the use of either method.

Figure 2:
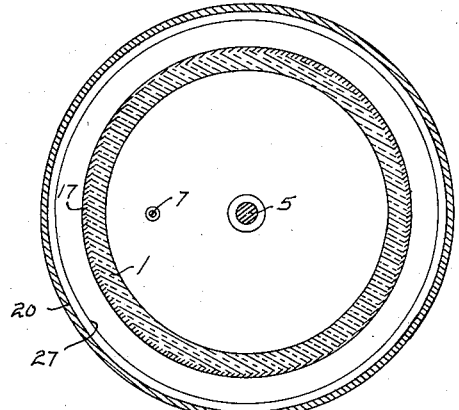
Fig. 2 is a cross sectional view taken from the plane 2—2 of Fig. 1.

Referring now to the drawings Figs. 1 and 2, I have illustrated an embodiment of my invention in connection with an electronic tube of the pool-cathode, rectifier, space-discharge type. The tube comprises a glass envelope 1 (the wall thickness of which has been magnified in the drawings for clearness) and containing in the lower portion a mercury or like cathode pool 2. A conductor 3 is sealed through the glass wall of the envelope and contacts with the pool. In the upper end of the envelope is an anode 4 to which is connected a conductor 5 sealed through the wall of the glass envelope. A starting and timing electrode 6 is disposed near the surface of the pool 2 and a conductor 7 therefor is sealed through the upper end wall of the envelope.

The three conductors 3—5—7 may be sealed through the glass envelope wall in any suitable manner, that shown constituting subject matter illustrated and described in my co-pending application Serial No. 422,390 filed December 10, 1941 for Method and means for sealing conductors to glass envelope walls and while the same constitutes no essential part of the present invention it may be said in passing that the said respective conductors are integrally joined, for example by soldering, to metal elements 8—9—10 respectively, integrally soldered to skins 11, 12, 13 respectively, formed on the glass surface of the envelope, as hereinbefore described, the layers or skins being preferably of circular pattern or configuration and surrounding openings 14, 15, 16 through which the respective conductors freely pass for purposes described in said copending patent application.

Coming now more particularly to the subject matter of the present invention, I form on or adjacent to the opposite end portions of the glass envelope and on the outer surface thereof, metallic skins or layers 17 and 18 in the form of bands circumscribing the envelope, utilizing therefore the hereinbefore described process.

A jacket is made of sheet metal comprising an intermediate tubular body portion 20 spaced from the envelope 1 and having at its ends heads 21 and 22 provided with flanges 23 and 24 respectively lying upon and substantially fitting the said band-form metallic skins 17 and 18. These flanges are soldered to the said skins making leak-proof junctures therewith. At opposite ends of the jacket as at 25 and 26, conduit connections are provided whereby cooling liquid may be introduced into the jacket at one end and flow from it at the other end.

In constructing the jacket above-described, the tubular side wall 20 of the jacket is preferably made separately from the heads 21 and 22, and after the flanges 23 and 24 have been soldered to the metallic skins 17 and 18, the side wall 20 is soldered at its ends to tubular flanges 27 and 28 on the heads 21 and 22. This method of construction compensates for variations in the length of the glass envelope which may occur in production. Also, the flanges 23 and 24 are preferably formed so as to engage the skins 17 and 18 on the convex portions of the envelope at its ends as shown, whereby they will engage the said skins, even if the diameter of the envelope varies in production.

In Figs. 3, 4, and 5 is shown another embodiment of my invention. Here, fins 29—29 of sheet metal are soldered to the outer surface of the glass envelope. Substantially vertical strips of metallic skin 30—30 as above-described are first formed on the glass envelope spaced apart therearound circumferentially. The fins are formed from sheet metal with feet or flanges 31—31 thereon and the flanges are soldered to the said skins to rigidly attach them to the glass envelope.

If desired, one or more for example two or three, of the fins may be continued longitudinally of the tube as shown at 32 and constitute a support for the tube. To this end, the continued fins may have feet 33 thereon for mounting them upon a support to support the tube. In this form the tube may be cooled by thermally induced currents of air flowing upwardly between and over the fins, or by air blown thereover.

Fig. 6 shows a modification of the form of Figs. 3, 4, and 5, in which the fins, here 34—34, are in the form of rings encircling the envelope and soldered thereto upon circumferential bands or skins 35 on the outer surface of the envelope. These annular fins may be incomplete circumferentially as indicated at 36—36, or may be in segments so as to be applicable to tubes which may vary somewhat in diameter. In this form the tube would preferably be cooled by air blown thereupon laterally.

In Fig. 7 is shown a modification of the form of Fig. 1. Here the lower jacket head flange 24 soldered to the envelope, continues longitudinally of the tube for a substantial distance providing a metal sleeve 37 at the end of the glass envelope and being attached to the glass envelope as described, and this may be used to mount or support the tube structure as a whole. To this end, a socket in the form of a tube-like receptacle 38 may be provided adapted to be mounted upon a support, for example by a flange or feet indicated at 39, and to mount the tube structure the metal sleeve may be inserted into the socket tube as shown.

In some cases it may be desirable to operate one part or one end, say the anode end, of the tube at a higher temperature than the rest of the tube, and for this purpose, the cooling fins may be mounted on the lower portions of the envelope; and when the jacket of Fig. 1 is employed it may stop short of the end of the tube as shown in Fig. 8. Here a shoulder 44 may be provided on the envelope below the upper end thereof and the jacket heads may be soldered thereto as described.

In soldering the metal parts to the glass envelope wall as described above, the metal may first be solder-tinned and when the metal is in position, it may be heated to fuse the solder-tinning to the skin; or both the skins and the metal parts may be first solder-tinned.

In the form of Figs. 1 and 7 solder may if desired be applied as at 40—41 in annular pools and allowed to harden to join the heads to the envelope before the outer jacket wall 20 is put on.

In the forms of Fig. 3 and Fig. 6 the skins may be discontinuous; and if desired solder as for example at 42 in Fig. 3 or at 43—43 in Fig. 6 may be applied to various edge portions of the metal parts to attach them to the skins and envelope.

Although the glass wall is usually very much thinner than is indicated in the drawings there is no liability that the soldering of the metal parts thereto will crack it. The metal after the soldering has been performed will be (and preferably is caused to be) hotter than the glass, so that, as it cools and contracts, it puts the glass under compression. The strength of glass is much greater under compression than under tension, and the cracking of thin glass envelope walls at the places where metal is integrally joined thereto in this art, generally speaking, results from tensil stress in the glass. Here tensil stress is avoided or is distributed over so large an area as to be negligible.

When the cooled metal parts heat up again in use, they may expand, but this merely removes the strain of compression and of course does not crack the glass.

In each of the forms above described, metal is integrally joined to the glass envelope, which is ideal for heat conductivity and heat transfer purposes.

In the form of Fig. 1, besides the conduction of heat from the envelope wall to the integrally joined heads 21 or 22, and metal wall 20, for direct radiation and conduction of heat to the atmosphere, heat is also conducted to the wall 20 and heads 21—22 by the fluid medium flowing through the jacket construction as a whole, and heat is also conducted away in the medium.

In forming the said skins on the glass, they may be made as thick as desired by applying several skins or layers one upon the other.

My invention is not limited to the exact details illustrated and described. Changes and modifications may be made, and my invention is comprehensive of all of the same which come within the scope of the appended claims.

I claim:

1. A glass walled tube or like container having a metallic skin integral with a portion of the glass wall surface, and a cooling element comprising a heat-conducting portion integrally joined to the skin and a heat transferring portion extending from the heat-conducting portion laterally of the tube wall surface and formed to facilitate the flow of a heat absorbing fluid medium thereover.

2. A glass walled tube or like container having a metallic skin integral with and circumscribing a portion of the glass wall surface and a cooling liquid jacket integrally joined at a portion thereof to the skin.

3. A glass walled tube or like container having a metallic skin integral with a portion of the glass wall surface; a cooling element comprising a heat-conducting portion integrally joined to the skin, and comprising a heat transferring portion extending from the heat conducting portion laterally of the tube wall surface and formed to facilitate the flow of a heat absorbing medium thereover; and supporting means connected to the cooling element for supporting the container.

4. A glass walled electronic tube or the like having a normal operating position and provided with metallic skin integral with a portion of the wall surface and a metal supporting element integrally joined to the skin and provided with means for supporting the tube in normal position.

5. A glass walled tube or like container having a metallic skin integral with a portion of the glass wall surface, and a cooling element comprising a heat-conducting portion integrally joined to the skin and a heat transferring fin extending from the heat conducting portion laterally of the tube wall surface.

6. A glass walled electronic tube or the like having a normal operating position and provided with a metallic skin integral with and circumscribing a portion of the glass wall surface, a cooling liquid jacket integrally joined at a portion thereof to the skin and the jacket being provided with means for supporting the tube in normal position.

7. A glass walled electronic or like tube having a normal operating position and provided with a metallic skin integral with a portion of the glass wall surface, a cooling element comprising a heat-conducting portion integrally joined to the skin and a heat transferring fin extending from the heat conducting portion laterally of the tube wall surface and the cooling element being provided with means for supporting the tube in normal position.

8. A glass walled tube or like container having a pair of axially spaced bands of metallic skin integral with and circumscribing the glass wall surface, and a cooling liquid jacket surrounding the tube and comprising heads integrally joined to the bands and a tubular wall spaced from the tube wall and connected to the heads.

PALMER H. CRAIG.